United States Patent

Galas

[15] 3,645,145
[45] Feb. 29, 1972

[54] CONTROL DEVICE FOR A TRANSMISSION

[72] Inventor: Jacques Galas, Puteaux, France

[73] Assignees: Automobiles Peugeot, Paris; Regie Nationale Des Usines Renault, Billancourt, France

[22] Filed: Nov. 3, 1970

[21] Appl. No.: 86,492

[30] Foreign Application Priority Data

Dec. 26, 1969 France...................................6945053

[52] U.S. Cl. .......................................................74/473 R
[51] Int. Cl. .......................................................G05g 9/18
[58] Field of Search....................74/473 R, 475 P, 476, 477, 74/471 XY

[56] References Cited

UNITED STATES PATENTS 2,094,976 10/1937 Bachman..................................74/473
2,828,644 4/1958 Harbour................................74/473 X

*Primary Examiner*—William F. O'Dea
*Assistant Examiner*—F. D. Shoemaker
*Attorney*—Burns, Doane, Swecker & Mathis

[57] ABSTRACT

Transmission control device having two orthogonal shafts to one of which a gear lever is connected. The two shafts are interconnected by a system including a tube integral with one of the shafts. The tube has oblong-shaped end portions which are orthogonal to each other and respectively guide two rollers respectively placed in an end position and in an intermediate position on a rod integral with the other shaft, whereby a longitudinal movement and a rotational movement of the shaft connected to the gear lever produce respectively a rotational movement and a longitudinal movement of the other shaft.

8 Claims, 3 Drawing Figures 3,645,145

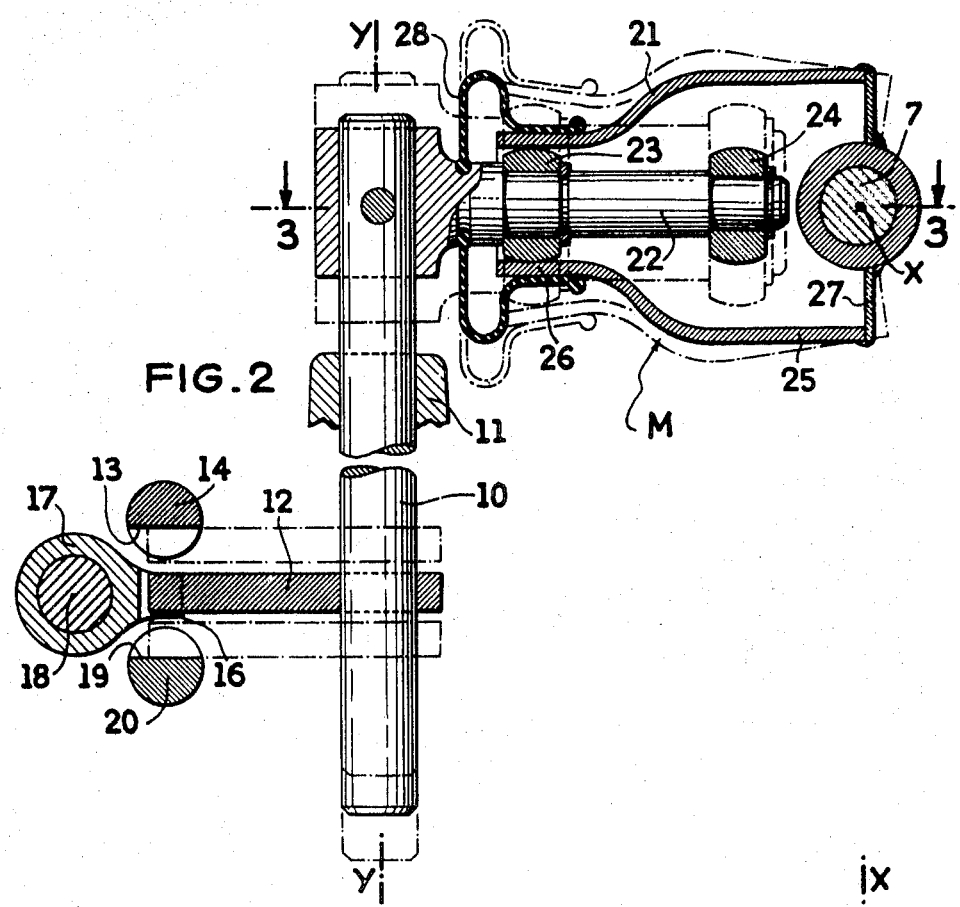
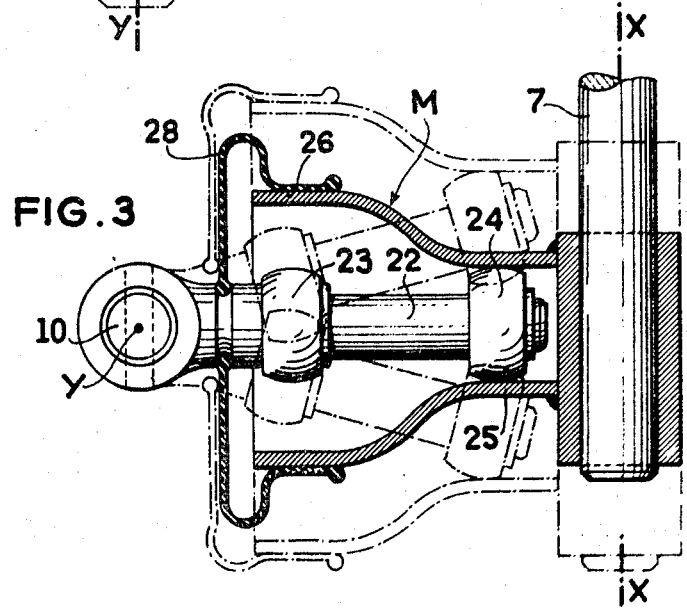

CONTROL DEVICE FOR A TRANSMISSION

The present invention relates to a control device for a transmission having a mechanical gear change and a manual control.

It is known that to engage a given speed ratio it is first necessary to select one of the fork rods and then shift the rod longitudinally which, through a fork, shifts the synchromesh or the sliding gear which puts into engagement the pair of gears corresponding to the selected ratio.

The present invention, which more particularly applies, for example, to a vehicle having a transverse engine-drive unit and a floor-mounted gear lever, concerns the connecting system between two elements having orthogonal axes which are alternately slidable and rotatable along and round their axes, rotation of the first element producing the rotation of the second element for selecting the fork rods, and sliding of the first element producing the rotation of the second element for engaging the selected speed.

The aforementioned connecting system comprises usually an intermediate pivotal arrangement which is such that its distance from the first element and the angle of rotation of the latter determines the amplitude of the linear displacement of the second element and such that its distance from the second axis and the amplitude of the linear displacement of the first element determines the angle of rotation of the second element. The drawback of this arrangement is that it results in a rather great distance between the two axes if it is desired to obtain extents of angular and sliding movements of the second element which are compatible with the distance between the axes of the fork rods and the travels of the synchronizers or sliding gears.

This is why devices have been proposed which have two pivotal means which render the two movements independent of each other and independent of the distance between the two axes which can be consequently considerably reduced. Such a device is described in U.S. Pat. application Ser. No. 773,862 now U.S. Pat. No. 3,550,467 filed by the applicants.

The object of the invention is to provide a mechanism which solves the same problem but which is simpler and therefore cheaper and can be mounted outside the casing of the transmission, which simplifies the design and assembly of the whole of the control device.

The invention provides a control device for a transmission comprising a gear lever connected to a first element so as to be capable of imparting thereto an angular movement and a sliding movement round and along a first axis, a second element capable of effecting a sliding movement and an angular movement along and round a second axis in response to the movements of said first element, and a connecting system connecting said two elements, said system comprising a male member and a female member respectively integral with one of said elements, one of said two members defining for the other member two guide faces of oblong shape having main axes which are respectively parallel to the axes of said elements.

If the two elements have orthogonal axes which are not contained in the same plane, the male and female members have, in a mean position, a common axis extending in the same direction as the perpendicular common to the axes of the two elements.

According to another embodiment, the female member is a tube having two oblong shaped portions defining said guide faces, the male member being a rod carrying two pivotal elements guided respectively in one of said portions of oblong shape.

Further features and advantages of the invention will appear from the ensuing description in which the device is shown to be applied to a vehicle having a transverse engine and drive unit and a floor-mounted gear lever.

In the drawings:

FIG. 3 is a sectional view taken along line 2—2 of FIG. 1, and

FIG. 3 is a vertical sectional view taken along line 3—3 of FIG. 2.

Figure 1:
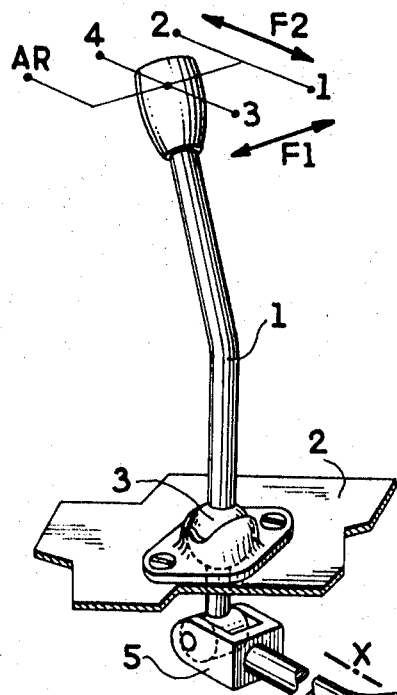
FIG. 1 is a perspective view of the assembly of the control device including the gear lever and the fork rods.
Figure 1:
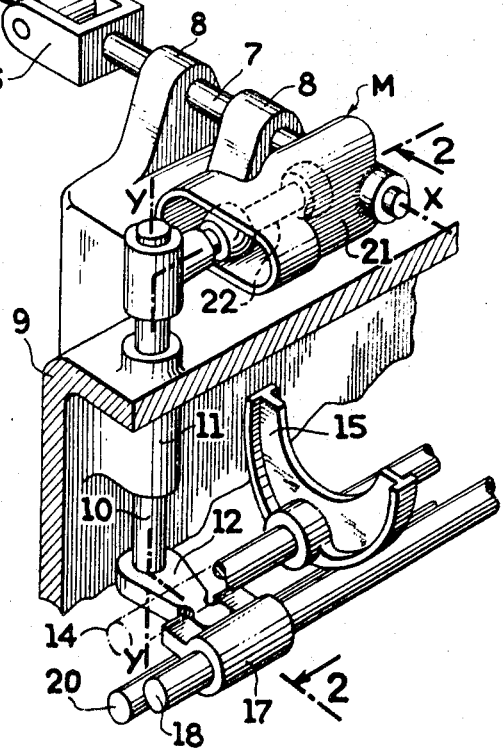

In the illustrated embodiment, a gear lever 1 is pivoted to a floor 2 of a vehicle by means of a ball joint 3. It transmits in the known manner through a rod 4 and two resiliently yieldable articulations 5 and 6, sliding and rotating movements to an element 7 having an axis X—X and guided in bearings 8—8 which are integral with the casing 9 of the transmission.

The sliding and rotating movements of the element 7 are converted, by a connecting system M according to the invention, into rotating and sliding movements of an element 10 having an axis Y—Y guided in a bearing 11 integral with the casing 9. The axes X—X and Y—Y are orthogonal.

A finger portion 12 rigidly connected to the element or shaft 10 is engageable in a recess 13 in a rod 14 of a fork 15 of the first and second speeds or in a recess 16 in a block 17 integral with a fork rod 18 of the third and fourth speeds, or in a recess 19 in a rod 20 of the reverse fork (FIG. 2).

The system M comprises a tube 21 integral with the element 7 and a rod 22 which is integral with the element 10 and extends into the tube 21. The rod 22 carries two pivotal elements, preferably constituted by rollers 23, 24 of plastics material, having a part-spherical outer face. The tube 21 is flattened at both ends in two directions which are orthogonal and respectively parallel to the axes X—X and Y—Y. End portion 25 adjacent the element 7 is flattened and extends in the same direction as axis Y—Y and end portion 26 adjacent the element 10 is flattened and extends in the same direction as axis X—X.

Each flattened portion 25, 26 has an inner contour having two straight portions interconnected by two semicircular portions. The distance between the straight portions corresponds to the outside diameter of the rollers plus a slight clearance to ensure smooth operation. The system M is completed by a wall 27 closing the end of the tube 21 adjacent the element 7 and a boot 28 of flexible material which affords a seal between the other end of the tube 21 and the rod 22. In this way, the system M is sealed against any entry of foreign bodies and can contain grease suitable for the entire life of the system.

The control device according to the invention operates in the following manner:

Movement of the lever 1 in the direction of arrow $F_1$, corresponding to speed selection, causes the element 7 to rotate round the axis X—X (FIG. 2). The end portion 26 of the tube 21 then drives the roller 23 in one direction or the other, the corresponding two extreme positions being shown in dot dashline in FIG. 2. This causes the element 10 to slide along axis Y—Y and permits engaging the finger portion 12 in one of the recesses 13, 16 or 19 of the fork rods (FIG. 2). The roller 24, which moves between the straight portions of the end portion 25 of the tube 21, does not intervene in the transmission of this movement.

Movement of the lever 1 in the direction of arrow $F_2$, corresponding to the engagement of a speed, causes the element 7 to slide along the axis X—X (FIG. 3). The end portion 25 of the tube 21 then shifts the roller 24 which causes the element 10 to rotate and results in a longitudinal movement of the previously selected fork rod. It is now the roller 25 which plays no part in the movement, this roller merely moving with respect to the straight portions of the end portion 26 of the tube 21.

Note that the device would operate in an identical manner if the tube 21 was made integral with the element 10 and the rod 22 was made integral with the element 7.

The device just described is particularly simple, cheap and reliable. This is a substantial improvement over known devices. Further, it can be mounted, as shown, outside the casing of the transmission, which considerably simplifies the design and assembly of the transmission and the assembly of the control device itself.

Having now described my invention what I claim and desire to secure by Letters Patent is:

1. A control device for a transmission comprising a first element, a gear lever operably connected to the first element for imparting thereto an angular movement and a sliding movement round and along a first axis, a second element, a connecting system interconnecting the two elements, the second element being slidably and angularly movable along and round a second axis in response to the movements of the first element, said connecting system comprising a male member and a female member, the male member being integral with one of the elements and the female member being integral with the other of the elements, one of the members having two oblong-shaped portions having major axes which are respectively parallel to said first axis and said second axis, each oblong-shaped portion defining two guide faces for the other of the members.

2. A device as claimed in claim 1, wherein the two elements have orthogonal axes which are contained in different planes, the male member and female member having in a mean position thereof a common axis extending in the same direction as the common perpendicular to the axes of the two elements.

3. A device as claimed in claim 1, wherein the female member is a tube having said two oblong-shaped portions, the male member being a rod carrying two pivotal elements, each pivotal element being guided in a corresponding one of said oblong-shaped portions.

4. A device as claimed in claim 3, wherein the pivotal elements are rollers having a part-spherical outer face engaged with a slight clearance in the corresponding oblong-shaped guide portions.

5. A device as claimed in claim 1, wherein the transmission has a casing and the first element is carried by two bearings outside the casing, the second element is guided in a bearing and extends into the casing, the connecting system being located outside the casing.

6. A device as claimed in claim 3, wherein the transmission has a casing and the tube is integral with the first element, the rod being integral with the second element and extending into said tube.

7. A device as claimed in claim 6, wherein one of the oblong-shaped portions of the tube is adjacent the first element and elongated in a direction parallel to the axis of the second element, and the other oblong-shaped portion is adjacent the second element and elongated in a direction parallel to the axis of the first element.

8. A device as claimed in claim 3, comprising means closing the tube at both ends.

* * * * *